(12) United States Patent
Deng et al.

(10) Patent No.: US 6,985,169 B1
(45) Date of Patent: Jan. 10, 2006

(54) IMAGE CAPTURE SYSTEM FOR MOBILE COMMUNICATIONS

(75) Inventors: Zhong John Deng, Albany, CA (US); Sudhir Muniswamy Gowda, Ossining, NY (US); John P. Karidis, Ossining, NY (US); Dale Jonathan Pearson, Yorktown Heights, NY (US); Rama Nand Singh, Bethel, CT (US); Hon-Sum Philip Wong, Chappaqua, NY (US); Jungwook Yang, West Nyack, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 585 days.

(21) Appl. No.: 09/021,176

(22) Filed: Feb. 9, 1998

(51) Int. Cl.
*H04N 7/18* (2006.01)
*H04N 7/14* (2006.01)

(52) U.S. Cl. .................... 348/61; 348/14.01
(58) Field of Classification Search ............... 348/14, 348/231, 839, 14.01, 61; 455/556; 395/893; 370/271; 351/41; 250/208.3; 396/51
See application file for complete search history.

(56) References Cited

U.S. PATENT DOCUMENTS

| | | | | |
|---|---|---|---|---|
| 4,928,300 A | * | 5/1990 | Ogawa et al. | 348/14.01 |
| 5,107,103 A | * | 4/1992 | Gruss et al. | 250/208.3 |
| 5,182,585 A | * | 1/1993 | Stoner | 351/41 |
| 5,253,286 A | * | 10/1993 | Sano et al. | 348/14.01 |
| 5,491,507 A | * | 2/1996 | Umezawa et al. | 348/14 |
| 5,502,727 A | * | 3/1996 | Catanzaro et al. | 370/271 |
| 5,550,754 A | * | 8/1996 | McNelley et al. | 348/14 |
| 5,634,080 A | * | 5/1997 | Kikinis et al. | 395/893 |
| 5,760,848 A | * | 6/1998 | Cho | 348/839 |
| 5,917,542 A | * | 6/1999 | Moghadam et al. | 348/231 |
| 5,970,418 A | * | 10/1999 | Budd et al. | 455/550 |
| 6,085,112 A | * | 7/2000 | Kleinschmidt et al. | 455/556 |
| 6,144,804 A | * | 11/2000 | Inoue | 396/51 |

* cited by examiner

*Primary Examiner*—Allen Wong
(74) *Attorney, Agent, or Firm*—F. Chau & Associates, LLC; Frank V. DeRosa

(57) ABSTRACT

An image capture system for mobile communications systems includes an imaging device for capturing optical image data and a data transfer apparatus coupled to a communications device communications device for transferring the optical image data to the communications device for transmittal over a communications network.

39 Claims, 4 Drawing Sheets

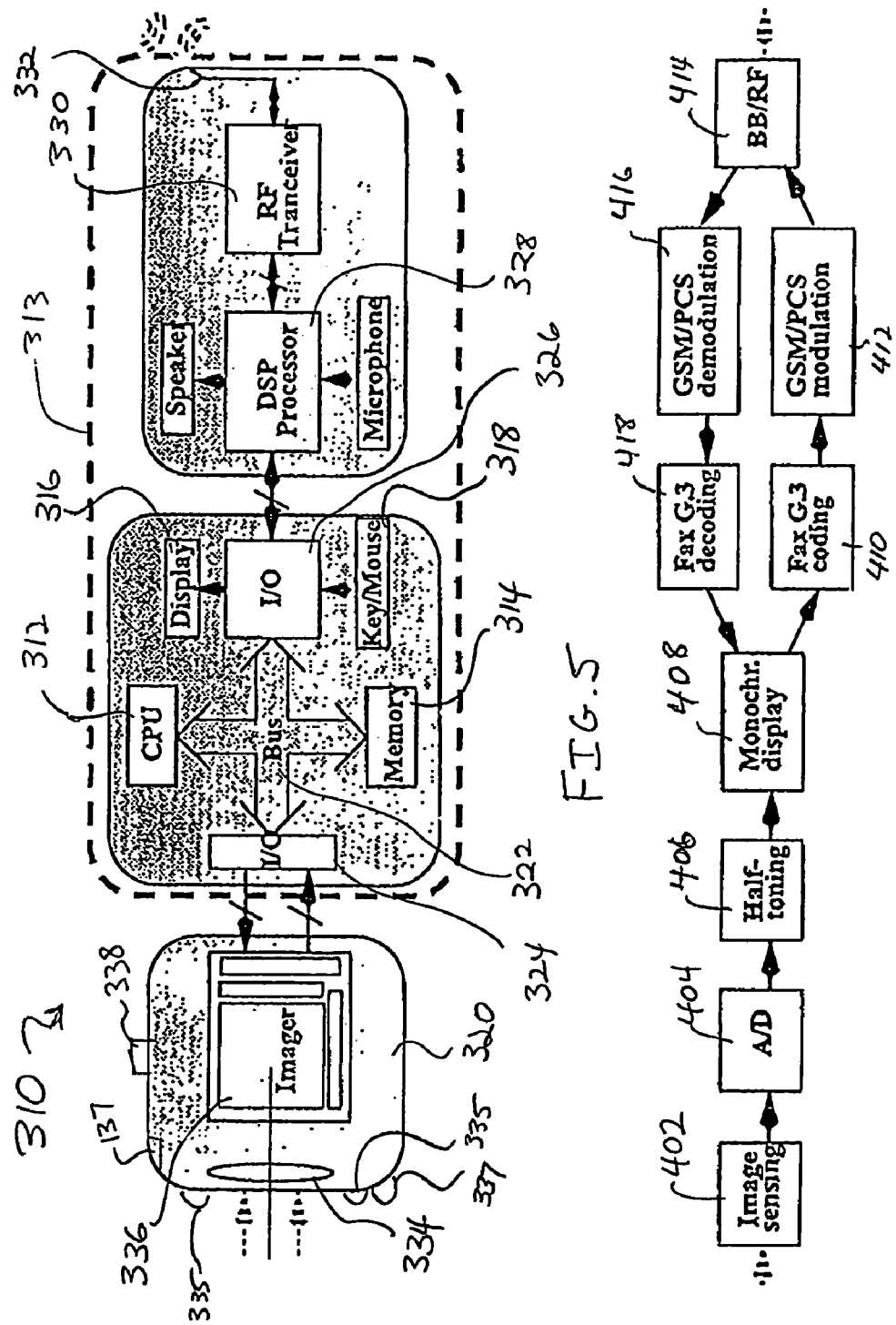

IMAGE CAPTURE SYSTEM FOR MOBILE COMMUNICATIONS

BACKGROUND OF THE INVENTION

1. Field of the Invention

The present invention relates to mobile communication devices and, more particularly, to an apparatus for capturing and transmitting an image over a mobile communication network.

2. Description of the Related Art

Mobile communications has increased enormously over the past several years. As a result business and personal users have become increasingly reliant on cellular phones, personal digital assistants (PDA), pagers, wireless FAX modems for use with laptop computers, etc.

The transmission of voice over a wireless network is performed by using a cellular telephone. Transmission of visual images may be performed by Faxing a page or transmitting data from a computer through the telephone system or over the Internet. Faxing may be performed from remote sites however, usually a laptop with a wireless modem is required. Also, a page or document to be Faxed must be scanned in or typed manually into the computer. If scanned in, a scanner is required which adds to the amount of equipment needed in order to remotely send visual images.

In a case where a visual image such as a reasonably complex figure or drawing is to be sent, it would be advantageous to be able to capture the image and send the image directly through a wireless network. Therefore, a need exists for an image capture device for use with a mobile hand held communications device. A further need exists for the image capture device to capture and transmit video or still images. Further, the image capture device may use a display to show images in real-time to an operator.

SUMMARY OF THE INVENTION

An image capture system for mobile communications systems includes an imaging device for capturing optical image data and transfer means coupled to a hand held communications device for transferring the optical image data to the communications device for transmittal over a communications network.

In alternate embodiments of the image capture system, the imaging device may further include an imager having a plurality of sensors wherein the optical image is captured by exposing the sensors to light from an object to be imaged. The imaging device may still further include a lens for directing light of the image to the imager. The imaging device may include a range finder to determine a position of an object to be imaged. The imaging device may further include a flash bulb for producing light on an object to be imaged. The transfer means may include an analog-to-digital convertor to convert the image data. The transfer means may further include a memory for storing the image data. The transfer means may include a digital signal processor, logic circuitry or a microprocessor for processing and coding the image data. The transfer means may include a data port for coupling the imaging device and the communications device. A viewfinder may also be included.

A portable imaging system includes a hand held communications device and a detachable imaging module for coupling to the communications device. The module includes an imager for receiving the light from a lens and converting the light to image data and processing means coupled between the imager and the communications device for processing, coding, compressing and transferring the image data wherein the image data are transferred to the communications device for transmission over a communications network.

In alternate embodiments of the portable imaging system, the imager may include a plurality of sensors wherein an image is captured by exposing the sensors to light from an object to be imaged. The imager may include an analog-to-digital convertor to convert analog image data to digital image data. The module further includes a memory for storing image data. The module still further includes a range finder to determine a position of an object to be imaged, and a flash bulb for producing light on an object to be imaged. The module may include a data port for coupling the module and the communications device. The processing means may include a processor, such as a digital signal processor or a microprocessor, and the processor may be programmed to adapt to system protocols of the communications device. A viewfinder may also be included.

Another portable imaging system includes a hand held portable communications device including a processor and a display and a detachable imaging module for coupling to the communications device. The module includes an imager for receiving the light from a lens and converting the light to image data, the imager coupling to the processor of the communications device. The processor performs processing, coding and compressing of the image data wherein the image data are transmitted over a communications network.

In alternate embodiments of the portable imaging system, the imager may include a plurality of sensors wherein an image is captured by exposing the sensors to light from an object to be imaged. The imager may include an analog-to-digital convertor to convert analog image data to digital image data. The module may include a memory for storing image data, a range finder to determine a position of an object to be imaged and/or a flash bulb for producing light on an object to be imaged. The module may also include a data port for coupling the module and the communications device. The processor may include software for displaying images on the display of the communications device. An image may be received from the communications network and may be displayed on the display. A viewfinder may also be included.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 5 is a schematic diagram of a image capture system in accordance with the present invention showing an image capture module and a cellular telephone having a microprocessor and a display; and FIG. 6 is a signal flow diagram for the system of FIG. 5.

DETAILED DESCRIPTION OF PREFERRED EMBODIMENTS

The present invention relates to mobile communication devices and, more particularly, to an apparatus for capturing and transmitting an image over a mobile communication network. An image capture system may be included for use with portable communication devices, for example cellular phones, personal digital assistants (PDA) and other portable devices. The image capture system may be used to capture optical images such as pages of documents, handwritten messages, hand-sketched drawings and other type of image related information. The captured image may be sent through a wireless network for example to central servers, the Internet, a Fax machine, a wireless mobile computer or other communication devices. The image capture system may have built-in integrated functions such as image processing, data formatting and data compression. Also features, such as imager-positioning, range-finding and a flash bulb may be included.

Figure 1:
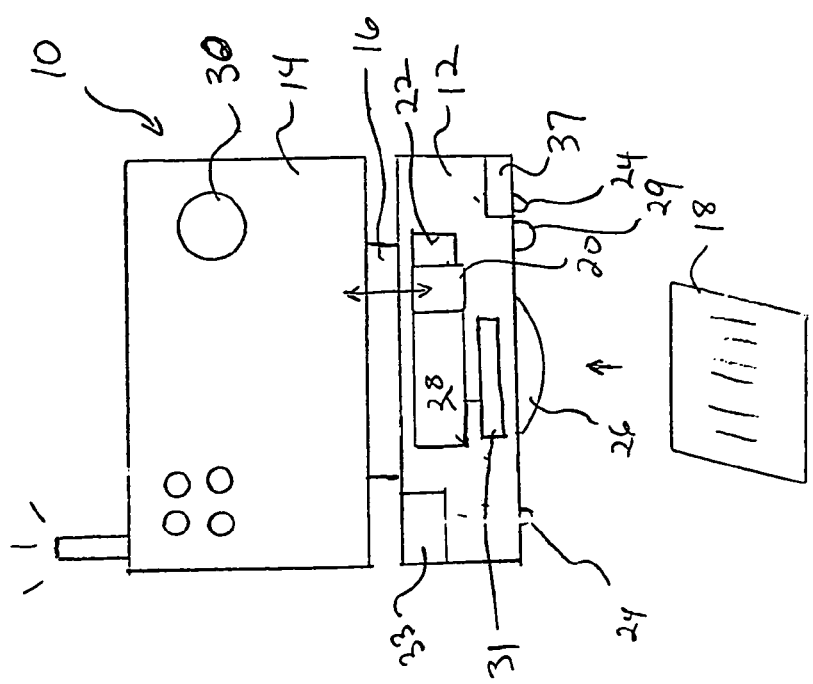
FIG. 1 is a schematic diagram of a communications device having an imaging system in accordance with the present invention.

Referring now in specific detail to the drawings, it should be understood that the elements shown in the FIGS. may be implemented in various forms of hardware, software or combinations thereof. Preferably, these elements are implemented in hardware on one or more appropriately functioning circuit boards which may include programmed general purpose processors, memory and input/output interfaces. Referring to FIG. 1, a schematic diagram is shown for an image capture system 10. Image capture system 10 includes an image capture module 12. Image capture module 12 may be manufactured as part of a communication device 14 or made to be detached from communication device 14. Device 14 may include a cellular phone, a wireless FAX machine, a modem or a computer. Module 12 communicates with device 14 through an interface 16. Module 12 includes a lens 26 therein for receiving optical images from an object 18. Module 12 optionally includes a pixel color filter array 31 or other device for providing color imaging. Module 12 processes the optical image using for example, an image sensor array with integrated digital functions such as subsampling and half-toning image processing. Other functions such as FAX-ready formatting and data compression are also performed. An imager chip 28 is included with a sensor array for receiving an image therein. A processor or microcontroller 20 and a memory buffer 22 are also included for interfacing with device 14. Logic circuitry or a digital signal processor may be used in addition to or in place of processor 20. Although not necessary for the invention, module 12 includes a rangefinder 24 for determining the distance between lens 26 and object 18. A flash bulb 29 is also included.

A shutter button 30 is provided to activate image capture. Shutter button 30 may be provided on either module 12 or device 14. When shutter button 30 is activated a shutter (not shown), either mechanical or electronic, opens to capture an optical image of object, for example text written on a page. The image is converted to electrical signals which are digitized, image processed, formatted and compressed. The image is transferred to device 14 for transmission or stored within memory buffer 22 of module 12 for retrieval at a later time.

In one embodiment module 12 may include an energy storage device 33, such as a battery. In this way images may be captured with module 12 independent of device 14. Images may be recovered and transmitted at a later time by connecting module 12 to device 14.

Transmission from device 14 may be to a central office through a wireless network, to the Internet, to another mobile device, such as a computer or FAX machine with a wireless modem, to a land based device, such as a computer with a modem or Fax machine or to other devices such as a PDA or pager. Transmission functions are performed by the communications device 14. A viewfinder 37 may also be included to position object 18 for image capture.

Figure 2:
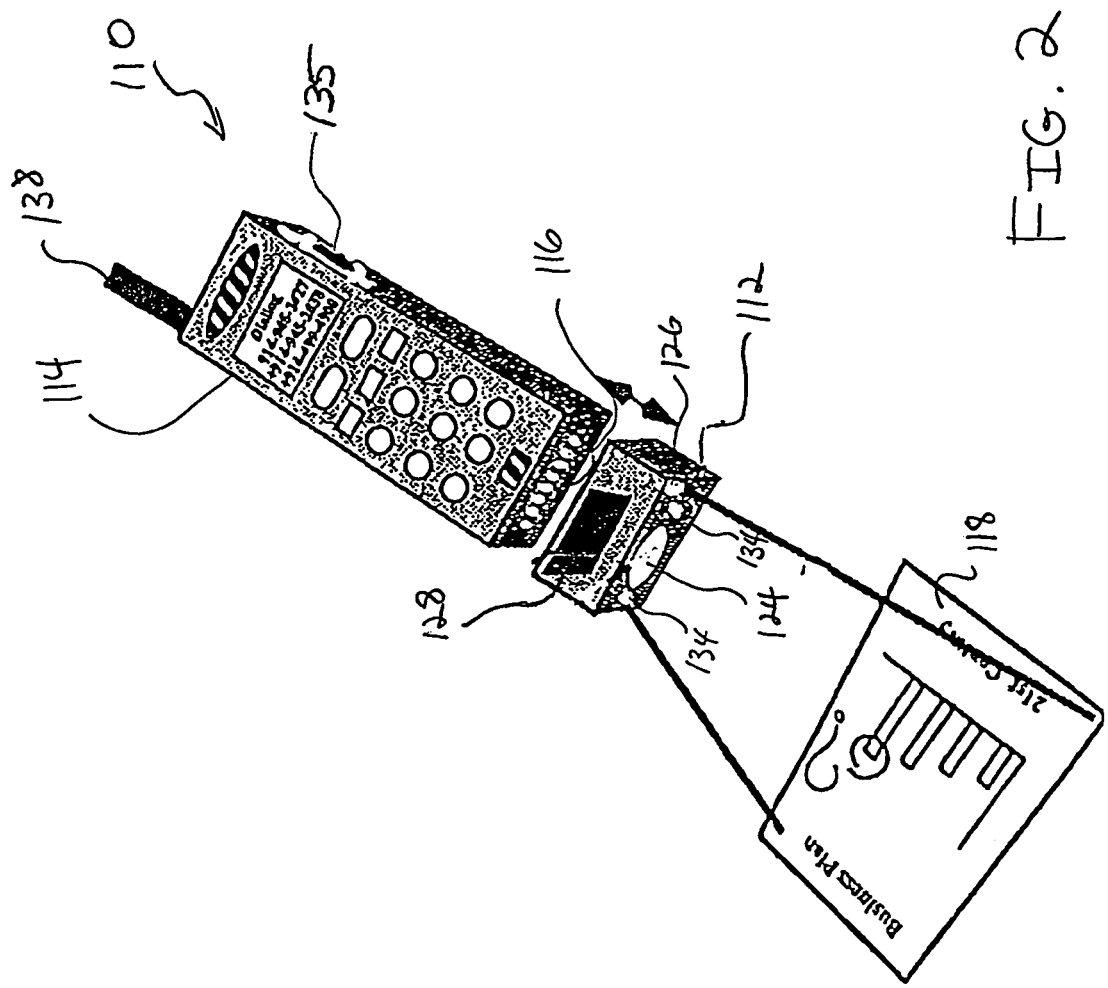
FIG. 2 is a perspective view with parts separated of a detachable imaging system and a telephone in accordance with the present invention.
Figure 3:
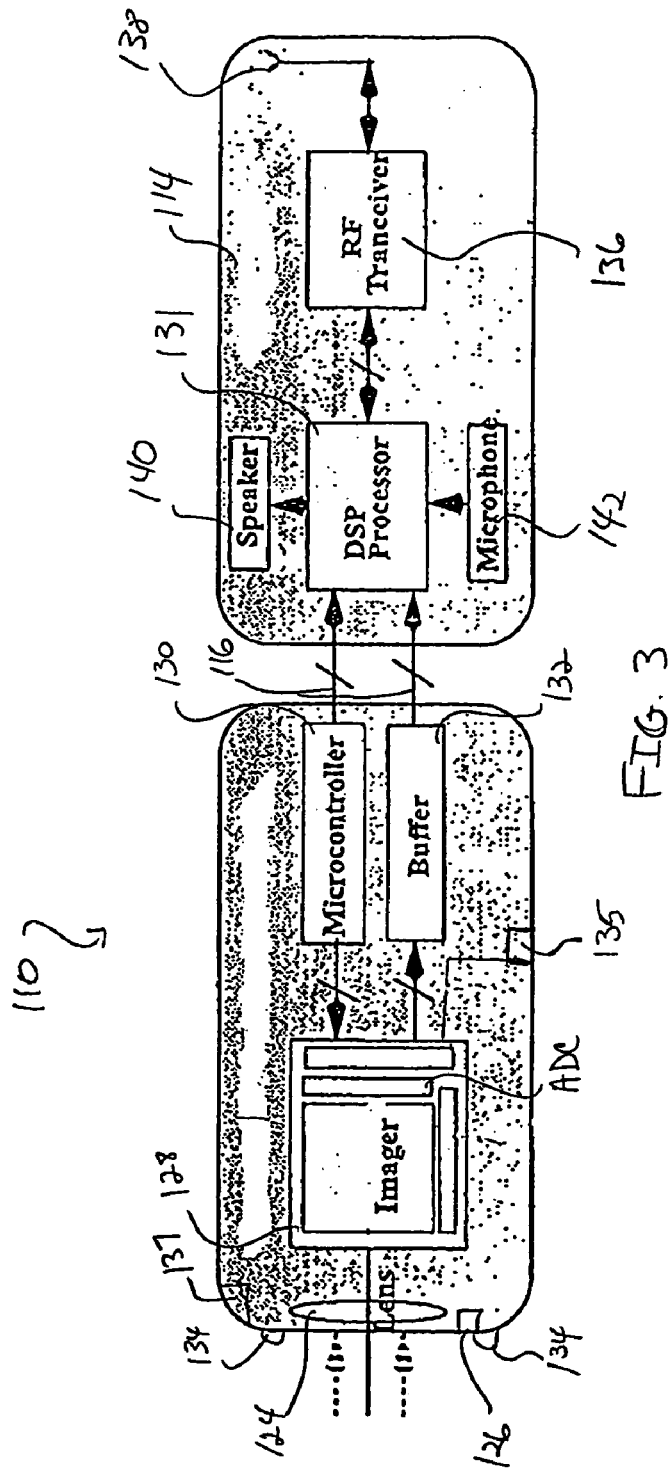
FIG. 3 is a schematic diagram of a image capture system in accordance with the present invention showing an image capture module and a standard cellular telephone.

Referring to FIGS. 2 and 3, a preferred embodiment of the present invention is shown. An image capture system 110 includes a cellular phone 114 and a detachable image capture module 112. Module 112 communicates with phone 114 through an interface or data port 116. Module 112 is integrated with a standard cellular phone.

Module 112 includes a lens 124 therein for receiving optical images from an object 118. Module 112 processes the optical image using, for example, an image sensor array with integrated digital functions such as subsampling and half-toning image processing. Other functions such as FAX-ready formatting and data compression are also performed. An imager chip 128 is one important aspect of module 112. A solid state photo sensor converts an optical signal into an electrical signal. The sensor array is included in imager chip 128 for receiving the image therein. Imager chip 128 stores a two-dimensional image. More memory is required for more detailed images. For example, a document page uses about 1.6 to about 2 million pixels to achieve sufficient resolution.

Each of these pixels is addressed with row and column logic, and the captured electrical signal can be digitized by on-chip analog-to-digital converters (ADC). The ADC can be multiplexed among columns of the image sensor or each column can have its own ADC. Image processing circuits and a FAX format encoder may be integrated on imager chip 128. Functions such as electronic zooming, subsampling, windowing and panning may be integrated into the pixel addressing scheme. Imager chip 128 may also include on-chip memory which may be useful for some image processing computations or output data buffering and storage.

In a preferred embodiment a CMOS imager chip is employed. The CMOS imager chip provides a high level of integration of on-chip functions such as analog-to-digital conversion, subsampling, electronic shuttering, zooming, windowing, panning, image processing and digital compression. CMOS imager chip also provides low power consumption and operates under low power supply voltage. A sheet of a document 8.5 inches×11 inches is captured with sufficient resolution by a CMOS imager array of about 1728×1076 pixels in standard FAX Group 3 format. Other technologies may also provide the resolution necessary for image processing, for example CCD (charge coupled device), CMD (charge modulated device) or CID.

For non-gray scale black and white images, only 1 bit resolution is needed. For gray-scale images, a half-toning process may be performed on the digitized signals of the image. Only 1 bit data for each pixel are passed to a format encoder, which is included on imager chip 128. The half-toning may be performed by processes known in the art, for example dithering or error diffusion. The FAX encoding also compresses data, typically with a 10:1 ratio for a letter document and a 15:1 ratio for a hand-sketched drawing. By compressing the data, output data is reduced to about 20 kilobytes which translates into a significant bandwidth savings for data transmission.

A FAX Group 3 format is preferred because it is a worldwide standard for telephone networks for facsimile transmission. FAX Group 3 is also commonly used for archiving images that are to be included in printed or hypertext documents. The FAX standards also form the basis for the compression of images to be transferred using standardized interchange formats. For example, TIFF "class F" uses the FAX encoding for raster images. Other image formats have been developed for computer storage processing and networking. These include FAX Group 4, GIF, TIFF, JPEG, PDF, etc. These formats may be supported with different format encoders within imager chip 128.

A processor or microcontroller 130 and a memory buffer 132 are also included for interfacing with a digital signal processor (DSP) 131 of phone 114. Logic circuitry may be included in addition to or on place of microcontroller 130. Microcontroller 130 may be an application specific integrated circuit (ASIC). Microcontroller 130 interfaces with imager chip 128. Microcontroller 130 also interfaces with DSP processor 131 and needs to employ various input/output (I/O) setups for different wireless communication products and brands. Microprocessor 130 must also support functions for communication protocols. I/O pin assignments and communication protocol may be similar to an existing wireless modem for laptop computers. In that case, a modem is plugged into the I/Os on a cellular phone. Memory buffer 132 may take the form of an on-chip memory buffer or a separate memory chip to store and buffer image files.

A shutter button 135 is provided to activate image capture. Shutter button 135 is provided on phone 114 (FIG. 2) or on module 112 (FIG. 3). When shutter button 135 is activated a shutter, for example, an electronic shutter, opens to capture an optical image of object 118, for example text written on a page. The image is converted to electrical signals which are digitized, image processed, formatted and compressed. The image is transferred to phone 114 for transmission from a transceiver 136, for example, RF through an antenna 138. Alternately the image may be stored within the memory buffer 132 of module 112 for retrieval at a later time.

Module 112 includes a rangefinder 134 for determining the distance between lens 124 and object 118. Rangefinder 134 may be implemented in various ways. For example, two light beams from sources such as solid-state laser diodes or light emitting diodes may be used to define an appropriate position of a page to be imaged. Using this technique provides a user of image capture system with a visual position to orient the page to be imaged, by for example red dots in the top left and bottom right corners of a page. For other applications, other range finding techniques would be more appropriate. For example, an acoustic signal reflected back to determine the distance to the object to be imaged. A viewfinder 137 may also be included.

In higher-end phone models having a liquid crystal display (LCD), real-time viewfinding may be employed for video images through the LCD. A large subsampling ratio (for example, 5:1) may be used with module 112 to capture real-time video to minimize bandwidth. A projection display may be included and integrated in the communication device, for example the handset of a phone. This allows a user to preview the image before transmission. Alternatively, an optical display may be included separate from the communication device.

A flash bulb 126 is also included on module 112. Flash-bulb 126 is used for capturing an image at any lighting condition. Light from flash bulb 126 permits the design of a smaller aperture for image exposure, which makes the depth of focus greater, and hence a greater distance between lens 124 and object 118 can be tolerated. Light from flash bulb 126 also reduces a minimum exposure time limit and allows images snapshots of moving objects or unsteady mounting of module 112 during image capturing.

In preferred embodiments, a simple cost-effective optical system is used. Lens 124 may include a focal length of about 15 mm with a numerical aperture of about 0.17, a field of view of about 16 degrees and 6 elements. A physical length dimension of an image capture module is preferably 20 mm or less, although various sizes are contemplated for different applications. Preferred focal distances may include approximately 250 mm for 200 dpi (dots per inch)×100 dpi over a range of an 8."×11" page, approximately 150 mm for 300 dpi×150 dpi over a range of 6"×7.8". A focal distance of infinity may also be included. A back-focal plane distance between focusing at infinity and focusing at 200 dpi and 300 dpi is about 0.8 mm and 0.9 mm, respectively.

Also, in preferred embodiments, at about normal office illumination (approximately 170 nits) with shot-noise limited sensor performance and a quantum efficiency of about 0.4 (a photocurrent of about 200 mA/W) for the sensors of imager 128, a signal-to-noise ratio of about 50 is desired for 32 to 64 gray-scale half-toning pictures.

Phone 114 also includes standard features, for example a speaker 140 and a microphone 142 for transmitting and receiving audio signals. Transmission from phone 114 may be to a central office through a wireless network to the Internet, another mobile device, such as a computer or FAX machine with a wireless modem, a land based device, such as a computer with a modem or Fax machine or to other devices such as a PDA.

Figure 4:
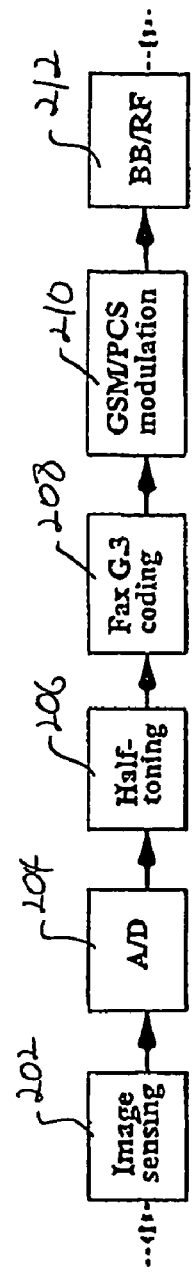
FIG. 4 is a signal flow diagram for the system of FIG. 3.

Referring to FIG. 4, a signal flow is shown for an optical image in accordance with the present invention. An optical image is input to imager chip 128 (FIG. 3) and converted to an electrical signal in block 202. In block 204 the electrical signal is converted from an analog signal to a digital signal by ADC. In block 206 half-toning processing occurs as described above. The signal is formatted into FAX Group 3 or other formats as desired in block 208. In block 210, Global System Mobile/Personal Communication Service (GSM/PCS) modulation occurs to convert the signal to prepare it for transmittal on a radio frequency carrier. Other protocols are contemplated as well. In block 212, the signal is integrated with a carrier and transmitted through antenna 138 (FIGS. 2 and 3) by Baseband/Radio Frequency (BB/RF) to be received by a base station or central office.

Referring to FIG. 5, a system architecture is shown for an image capture system 310 for a wireless cellular phone 313 having a microprocessor 312, a memory 314, a display 316 and a keyboard/mouse 318. An advanced wireless communication device may be used to enhance the capabilities of image capture system 110. This advanced type of high-end cellular phone has many advantageous features to employ an image capture module 320 as described herein. This type of phone may also include an operating system and some application programs.

System 310 performs all of the functions as described for systems 10 and 110. Microprocessor 312 and memory 314 of phone 313 function as microprocessor 130 and memory 132 of system 110 (FIG. 3). A bus 322 exchanges data between an interface I/O port 324, memory 314, microprocessor 312 and an I/O device 326. I/O device 326 can be driven by keyboard/mouse 318 or drive display 316. Display 316 may include a liquid crystal display (LCD). I/O device 326 is coupled with a DSP processor 328 of phone 313. DSP processor 328 is coupled to a transceiver 330, for example, an RF transceiver which inputs image data onto a carrier signal and transmits or receives data through antenna 332.

Module 320 is essentially as described above. However, module 320 is simplified by utilizing microprocessor 312 and memory 314 of phone 313 to process images. Module 320 includes an optical system which includes a lens 334 and an imager chip 336, such as a CMOS imager chip. Imager 336 is coupled to interface 324 and transfers data to and from bus 322. Further, module 320 may include a rangefinder 335 and a flash bulb 337 as described above. A shutter button 338 which functions as described above is also included.

Given the display capabilities of phone 313. An image may not only be sent to a remote location, but an image may be displayed on display 316 of phone 313. An operator may therefore view an image recently captured or view an image sent to the operator over a wireless network. A viewfinder 137 may also be included.

Referring to FIG. 6, a signal flow is shown for system in accordance with the present invention. An optical image is input to imager chip 336 (FIG. 5) and converted to an electrical signal in block 402. In block 404 the electrical signal is converted from an analog signal to a digital signal by an ADC. In block 406, half-toning processing occurs. A visual image is displayed on display 316 (FIG. 5) in block 408. The signal is formatted into FAX Group 3 or other formats as desired in block 410. In block 412, GSM/PCS modulation occurs to convert the signal to prepare it for transmittal on a radio frequency carrier. In block 414, the signal is integrated with a carrier and transmitted through antenna 332 (FIG. 5) to be received by a base station or central office.

Alternately, a signal may be received in block 414 and displayed on display 316 (FIG. 5). The signal undergoes GSM/PCS demodulation to extract data from a carrier in block 416. The data is decoded from FAX Group 3 or other formats in block 418, and the data is displayed on display 316 to be viewed by an operator in block 408.

The image capture systems described herein are not limited to wireless phones. Instead, other devices such as, a laptop computer with a wireless modem or other transmission device, such as cordless phones, may be used with the image capture module adapted to the transmission device. It is also contemplated that in addition to a mechanical connection, the image capture module and the communications device may communicate by a wireless technique as well, for example, infrared data transfer.

Having described preferred embodiments of an image capture system for mobile communication (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An image capture system for mobile communication system comprising:
   a handheld imaging device for capturing image data;
   the handheld imaging device including a transfer interface which provides coupling to a handheld communications device for transferring the image data to the communications device for transmittal over a communications network;
   the handheld communications device configured and dimensioned to receive the handheld imaging device, the handheld imaging device being completely detachable from the handheld communications device; and
   wherein the handheld imaging device comprises a processor for processing and coding the image data and for formatting image data for facsimile transmission over the communications network; and a rangefinder for enabling a user to visually position an object to be imaged.

2. The image capture system as recited in claim 1, wherein the imaging device further comprises:
   an imager chip having a plurality of sensors responsive to incident light wherein an optical image is captured by exposing the sensors to light from an object to be imaged.

3. The image capture system as recited in claim 2, wherein the imaging device further comprises a lens for directing light of the image to the imager chip.

4. The image capture system as recited in claim 1, wherein the imaging device includes an analog-to-digital converter coupled thereto to convert the image data.

5. The image capture system as recited in claim 1, wherein the imaging device further comprises a memory for storing the image data.

6. The image capture system as recited in claim 1, wherein the imaging device further comprises logic circuitry for processing and coding the image data.

7. The image capture system as recited in claim 1, wherein the imaging device further comprises a viewfinder to determine a position of an object to be imaged.

8. The image capture system as recited in claim 1, wherein the imaging device further comprises a flash bulb for illuminating an object to be imaged.

9. The image capture system as recited in claim 1, wherein the transfer interface includes a directly mateable data port for coupling the imaging device and the communications device without a cable.

10. The image capture system as recited in claim 1, wherein the handheld communications device includes a shutter button provided on the handheld communications device for activating a shutter on the handheld imaging device.

11. The image capture system as recited in claim 1, wherein the handheld communications device is a telephone and the handheld imaging module includes a length of 20 mm or less.

12. The image capture system as recited in claim 1, wherein the rangefinder comprises means for emitting a light beam to enable the user to visually position the object to be imaged.

13. The image capture system as recited in claim 1, wherein the rangefinder comprises means for determining a distance between the image capture system and the object to be imaged.

14. A portable imaging system comprising:
   a handheld communications device dimensioned and configured to receive a completely detachable handheld image module;
   the detachable handheld imaging module for coupling to the communications device to enable images to be captured, the detachable handheld imaging module comprising:

an imager for receiving the light from a lens and converting the light to image data;

a processor for processing, coding, compressing and transferring the image data wherein the image data are transferred to the communications device for transmission over a communications network;

a data formatter for formatting the image data for facsimile transmission over the communications network; and a rangefinder for enabling a user to visually position an object to be imaged.

15. The portable imaging system as recited in claim 14, wherein the imager further comprises a plurality of sensors on an image chip wherein an image is captured by exposing the sensors to light from an object to be imaged.

16. The portable imaging system as recited in claim 14, wherein the imager includes an analog-to-digital converter to convert analog image data to digital image data.

17. The portable imaging system as recited in claim 14, wherein the module further comprises a memory for storing image data.

18. The portable imaging system as recited in claim 14, wherein the module further comprises a viewfinder to determine a position of an object to be imaged.

19. The portable imaging system as recited in claim 14, wherein the module further comprises a flash bulb for illuminating an object to be imaged.

20. The portable imaging system as recited in claim 14, wherein the module includes a directly mateable data port for coupling the module and the communications device without a cable.

21. The portable imaging system as recited in claim 14, wherein the processor is programmed to adapt to system protocols of the communications device.

22. The portable imaging system as recited in claim 14, wherein the processor includes logic circuitry.

23. The portable imaging system as recited in claim 14, wherein the handheld communications device includes a shutter button provided on the handheld communications device for activating a shutter on the imaging module.

24. The portable imaging system as recited in claim 14, wherein the handheld communications device is a telephone and the handheld imaging device includes a length of 20 mm or less.

25. The portable imaging system as recited in claim 14, wherein the rangefinder comprises means for emitting a light beam to enable the user to visually position the object to be imaged.

26. The portable imaging system as recited in claim 14, wherein the rangefinder comprises means for determining a distance between the image capture system and the object to be imaged.

27. A portable imaging system comprising:
a handheld communications device including a processor and a display, the handheld communications device dimensioned and configured to receive a completely detachable imaging module, wherein the detachable imaging module couples to the communications device to enable images to be captured, wherein the detachable imaging module comprises an imager for receiving the light from a lens and converting the light to image data, the imager coupling to the processor of the communications device for processing, coding and compressing the image data wherein the image data are transmitted over a communications network; and a data formatter for formatting the image data for facsimile transmission over the communications network; and
a rangefinder for enabling a user to visually position an object to be imaged.

28. The portable imaging system as recited in claim 27, wherein the imager further comprises a plurality of sensors on an image chip wherein an image is captured by exposing the sensors to light from an object to be imaged.

29. The portable imaging system as recited in claim 27, wherein the imager includes an analog-to-digital converter to convert analog image data to digital image data.

30. The portable imaging system as recited in claim 27, wherein the module further comprises a memory for storing image data.

31. The portable imaging system as recited in claim 27, wherein the module further comprises a viewfinder t determine a position of an object to be imaged.

32. The portable imaging system as recited in claim 27, wherein the module further comprises a flash bulb for illuminating an object to be imaged.

33. The portable imaging system as recited in claim 27, wherein the module includes a directly mateable data port for coupling the module and the communications device without a cable.

34. The portable imaging system as recited in claim 27, wherein the processor includes software for displaying images on the display of the communications device.

35. The portable imaging system as recited in claim 27, wherein an image is received from the communications network and displayed on the display.

36. The portable imaging system as recited in claim 27, wherein the handheld communications device includes a shutter button provided on the hand held communications device for activating a shutter on the imaging module.

37. The portable imaging system as recited in claim 27, wherein the handheld communications device is a telephone and the handheld imaging device includes a length of 20 mm or less.

38. The portable imaging system as recited in claim 27, wherein the rangefinder comprises means for emitting a light beam to enable the user to visually position the object to be imaged.

39. The portable imaging system as recited in claim 27, wherein the rangefinder comprises means for determining a distance between the image capture system and the object to be imaged.

* * * * *